Patented Dec. 27, 1949

2,492,173

UNITED STATES PATENT OFFICE 2,492,173

FLOW OF THICKENED FLUIDS

Karol J. Mysels, New York, N. Y., assignor, by mesne assignments, to the United States of America as represented by the Secretary of War No Drawing. Application June 12, 1947,
Serial No. 754,277

17 Claims. (Cl. 137—78)

This invention relates to the flow of thickened fluids, and more particularly to a method for conveying a liquid, such as gasoline, through a pipe at high speed.

All liquids are always subject to resistance to flow during passage through a pipe, resulting in a pressure drop along the conduits. The resistance to flow and pressure drop in general increases with the rate of flow. At low rates of flow, the flow is streamlined up to a certain critical limit. Above this critical limit the flow becomes turbulent and the resistance of the liquid to flow increases much faster with an increase in speed than during streamlined flow. In other words, the actual resistance to flow in the turbulent region is much greater than calculated on the basis of streamlined flow. The transition point of a Newtonian fluid from streamlined to turbulent flow for a given liquid in a given conduit can be approximately determined by the Reynolds' number (Eshbach, Handbook of Engineering Fundamentals, 1936, pp. 6–29), which is computed by multiplying the mass density of the fluid by the average axial velocity of flow and by the pipe diameter, and dividing the product by the viscosity of the fluid.

Consequently, inasmuch as turbulence for a given Newtonian fluid in a pipe of given diameter must necessarily occur at a certain given speed of pumping, the capacity of a pipe for the conveyance of a Newtonian liquid is necessarily limited, as the speed of pumping cannot be economically increased beyond the point at which turbulent flow occurs. This phenomenon is of particular importance in the piping of gasoline, a fluid which is substantially Newtonian. Thus, once a pipe line is laid, its capacity in gallons per minute cannot be increased beyond the rate which causes turbulent flow, even by the installation of stronger pumps; and the laying of an additional or of a larger substitute pipe line becomes necessary. In the course of military operations it is now feasible to lay small-diameter pipe lines with a maximum of speed and efficiency by uncoiling a flexible pipe from a truck-borne or even airborne reel, but the diameter of such a pipe is necessarily small and its capacity in gallons per minute is limited accordingly.

I have discovered that the flow rate of a liquid through a pipe can be greatly increased by transforming it into a non-Newtonian thixotropic gel. A thixotropic gel becomes quite fluid upon agitation, such as agitation caused by friction incident to the flow of liquid through a pipe. With an increase in the rate of speed of flow, resistance to flow of such a substance increases, but turbulence does not yet occur at the point where it occurs in the corresponding unthickened Newtonian fluid. At low rates of speed, resistance to flow of a thickened thixotropic substance is greater than that of the corresponding unthickened non-thixotropic substance, as is to be expected from the higher viscosity of the former. However, above the critical rate of flow which causes turbulence in the unthickened liquid, the resistance to flow of the unthickened liquid rises so sharply that it exceeds the resistance to flow of the thixotropic substance at the corresponding rate of speed.

Measurements of viscosity coefficients are almost always made in the streamlined flow region, and on this basis it has been found that unthickened Newtonian liquids have a constant viscosity coefficient independent of flow rate, while thickened pseudoplastic or thixotropic liquids or gels (sometimes called "jellies") have a viscosity coefficient decreasing with increasing flow (shear) rate. As streamlined flow rates, the viscosity coefficient of a Newtonian unthickened liquid is always smaller than that of a corresponding thixotropic liquid prepared by gelling the former liquid with an appropriate thickener. But when a flow rate is reached at which turbulent flow occurs in the unthickened liquid, the increase in pressure drop for the unthickened liquid rises sharply, while the increase in pressure drop for the corresponding thickened thixotropic liquid continues to rise as slowly as before. Thus, for the same pipe line and the same high flow rate, the pressure drop becomes smaller for the thickened liquid and it is easier to pump, at such high rate, gasoline converted into a thixotropic gel with an appropriate thickener than the same volume of unthickened gasoline.

While no theoretical explanation for this surprising phenomenon is available at the present time, I believe that it is probably due to the special character of variation of the viscosity coefficient of the thixotropic liquid with rate of shear caused by the flow through the pipe, so that the flow of the thickened liquid remains streamlined and above the rate of flow which causes turbulence to a corresponding unthickened Newtonian liquid.

In utilizing this observation in the high-speed transportation of a liquid through a pipe, the liquid is converted into a thixotropic gel by adding an appropriate thickener prior to its introduction into the pipe line, and the thickener is removed at the point of destination by breaking the gel.

Among the important objects of my invention, which I am about to describe in greater detail, is a method whereby the carrying capacity of a pipe line of given diameter can be increased beyond rates of delivery heretofore possible.

Another principal object of my invention is a simple process whereby a liquid, such as gasoline, is converted into a thixotropic gel prior to conveyance through a pipe line, and reconverted into ordinary gasoline at the delivery point with recovery of the thickener.

A further object of my invention is avoidance, or at least deferment, of the expense incident to the laying of an additional or substitute pipe line where the existing pipe line is inadequate due to its limited carrying capacity.

A further object of my invention is the utilization of small-diameter pipe lines for great loads of liquids.

Yet another object of my invention is the conveyance of large quantities of gasoline, treated in accordance with my invention, through a small-diameter, temporary military pipe line.

Other objects and advantages of my invention will become readily apparent from its following detailed description and from several examples of carrying out the same, which examples, however, are not to be considered to mark the boundaries of the scope of my invention.

The liquid whose transportation through a pipe line has the greatest economical importance is gasoline. In order to prepare it for pipeline transportation in accordance with my invention, it is slightly thickened by the addition of a thickener capable of converting it into a thixotropic gel. I have found a great number of substances suitable for this purpose, most of which fall in the category of organic low- or medium-molecular-weight substances of salt-like character, which upon dissociation tend in part to dissolve in the hydrocarbon and in part to precipitate; this results in the formation of colloidal particles in which the insoluble parts of the molecules stick together and the soluble parts are on the outside. The thickener which I have found to be most suitable in connection with gasoline is a 2:1:1 mixture of the aluminum soap of coconut oil acid, aluminum naphthenate and aluminum oleate; this mixture and related mixtures are known by the name of "Napalm" and will be discussed in somewhat greater detail hereinafter. However, other soaps of fatty acids and other acids having from 10 to 20 carbon atoms are suitable, the metal ions being calcium, barium, aluminum, and even sodium and lithium. Practically any metal soap can be used as long as it possesses the above-mentioned characteristic of being part soluble and part precipitable in the liquid, and even salts of organic acids and amines have been found to be successful under such conditions. The formation of the thixotropic gel is frequently aided by the addition of extenders, such as water, alcohol, ketones, fatty acids or amines, in order to promote the homogeneity of the solution. Another type of thickener is rubber or a similar high-molecular-weight oil-soluble material, whose molecules themselves form the colloidal particles.

Other liquids besides gasoline may be treated in accordance with my invention. For instance, aqueous liquids or alcohols may be thickened by water-soluble soaps, e. g., sodium, ammonium and potassium soaps, added in sufficient quantity to convert such liquids into a thixotropic gel. In addition to soaps, compounds such as mucilage starch and gelatin may be used.

The principle of my invention is even applicable to gases, which can be given thixotropic properties and structural viscosity by converting then into foam or smoke in conventional manner, e. g. by thickening them with an aerosol. However turbulent flow is not a pressing technological problem in gas-piping.

After passage through the pipe line, the thixotropic gel is broken and separated into liquid and thickener by any of a great variety of methods, such as, for instance, addition of a peptizer, e. g., ammonia or an amine in the case of an aluminum-soap thickener, a strong acid if a sodium soap has been used, or an enzyme in the case of mucilage; or the gel may be broken by distillation or by extraction with a solvent, or by inducing precipitation. In the case of gasoline thickened with "Napalm," the gel breaks spontaneously upon aging. The recovered thickener may, of course, be used again for processing a new batch of liquid to be transported.

The cost of treating a liquid in accordance with my process, e. g., treating gasoline with "Napalm" to make it into a thixotropic gel and recovering the "Napalm" by distillation, is estimated to amount to a fraction of a cent per gallon, probably in the neighborhood of one-tenth of a cent per gallon.

The "Napalm" which I found particularly useful in the conversion of gasoline into a thixotropic gel is a special aluminum soap, or rather, a mixture of aluminum soaps, which was developed by and in cooperation with the Chemical Warfare Service (now, Chemical Corps), U. S. Army, and has been used with great success in the preparation of fuel compositions for flame throwers and incendiary bombs. Preparation and composition of various "Napalms" have been described in an article entitled "Napalm" on page 768 of the Industrial Edition of Industrial and Engineering Chemistry of August, 1946 (vol. 38, No. 8). The "Napalms" are mixtures of aluminum soaps of naphthenic acids with aluminum soaps of coconut oil acids and/or aluminum salts of saturated or unsaturated aliphatic acids such as lauric or oleic. A "Napalm" may, but need not necessarily, contain the aluminum soap of palmitic acid. While all "Napalms" are suitable to carry out my invention as applied to gasoline, I have obtained particularly favorable results with the use of a "Napalm" comprising a 2:1:1 mixture of aluminum soap of coconut oil acid, aluminum naphthenate and aluminum oleate. Preparation and properties of this mixture are given on page 771 of the just-quoted article in Industrial and Engineering Chemistry, which (in Table III) recites its properties as follows:

Acid analysis:
    Acid No. _____ 271.7
    Saponification No. _____ 270.6
    Titer, °C _____ 23.5
    Iodine No. _____ 8.2
    Unsaponifiables, percent _____ 0.26
    Probable lauric, percent _____ 47.1
Stoermer viscosity at 650-g. load, R. P. M.:
    Initial _____ 0.092
    After aging at 125° F. _____ 0.11

In the following specific examples, the "Napalm" is such a 2:1:1 mixture of aluminum soaps.

*Example I*

Gasoline is gelled by adding 2.5% by weight of

"Napalm." The thixotropic gel formed is introduced into a ⅛-inch pipe and forced through by a pump or equivalent means at various flow rates ranging from 1 to 10 gallons per minute. The pressure drop in p. s. i./ft. of the gel is as follows:

| Flow rate in gals./min. | Unthickened gasoline (control) | Thixotropic liquid |
|---|---|---|
| 1 | .4 | .95 |
| 1.5 | .8 | 1.05 |
| 2 | 1.4 | 1.2 |
| 3 | 2.9 | 1.7 |
| 4 | 4.8 | 2.2 |
| 5 | 7.0 | 2.9 |
| 6 | 10.0 | 3.75 |
| 7 | 13.0 | 4.7 |
| 8 | 17.0 | 5.8 |
| 9 | 21.0 | 7.1 |
| 10 | 25.0 | 8.5 |

At a flow rate of 2 gallons per minute the pressure drop of the thixotropic liquid ("Napalm"-treated gasoline) approximately equals that of the untreated gasoline, while at a flow rate of 4 gallons per minute the pressure drop of the treated gasoline is only one-half, and above 6 gallons per minute only about one-third of the pressure drop of the untreated gasoline.

After arrival of the gasoline at the delivery end of the pipe, the thixotropic liquid again gels and is then broken into gasoline and "Napalm" by distillation or otherwise.

*Example II*

Gasoline is gelled by adding 4.5% by weight of "Napalm," and the thixotropic gel formed is forced through by a pump or equivalent means a ½-inch pipe at various rates of flow. Pressure drop in p. s. i./ft. as compared with the pressure drop of untreated gasoline transmitted at the same rates of speed are as follows:

| Flow rate in gals./min. | Unthickened gasoline (control) | Thixotropic liquid |
|---|---|---|
| 5 | .16 | .61 |
| 6 | .22 | .73 |
| 7 | .3 | .77 |
| 8 | .39 | .81 |
| 9 | .5 | .85 |
| 10 | .62 | .9 |
| 11 | .75 | .95 |
| 12 | .9 | 1.0 |
| 13 | 1.05 | 1.05 |
| 14 | 1.2 | 1.1 |
| 15 | 1.4 | 1.15 |
| 16 | 1.6 | 1.21 |
| 17 | 1.8 | 1.27 |
| 18 | 2.0 | 1.33 |
| 19 | 2.2 | 1.4 |
| 20 | 2.45 | 1.47 |

Above a flow rate of 13 gallons per minute, the pressure drop of the thixotropic liquid is less than that of the untreated gasoline, and at a flow rate of 20 gallons per minute is only about 56% of the pressure drop of the untreated gasoline.

Breaking of the gel at the delivery end of the pipe is the same as in the preceding example.

*Example III*

The thixotropic gel of Example II is forced through by a pump or equivalent means a 1-inch pipe. Its pressure drop in p. s. i./ft. at various rates of flow compare with the pressure drop of unthickened gasoline at the same rates of flow as follows:

| Flow rate in gals./min. | Unthickened gasoline (control) | Thixotropic liquid |
|---|---|---|
| 25 | .09 | .40 |
| 30 | .14 | .42 |
| 35 | .18 | .44 |
| 40 | .24 | .46 |
| 45 | .29 | .48 |
| 50 | .36 | .50 |
| 55 | .43 | .52 |
| 60 | .52 | .55 |
| 65 | .60 | .58 |
| 70 | .70 | .61 |
| 75 | .80 | .64 |
| 80 | .90 | .67 |

Thus, at a flow rate of 60 gallons per minute through a 1-inch pipe, the pressure drop in the thickened composition is only slightly above that of the unthickened liquid, and at and above 65 gallons per minute the pressure-drop characteristics of the thixotropic liquid are more favorable than those of the unthickened gasoline. At a flow rate of 80 gallons per minute, the pressure drop of the thixotropic liquid is 75% of the pressure drop of the unthickened gasoline.

Breaking of the gel and recovery of the thickener is the same in Example III as in the preceding examples.

The viscosity of the 4.5% "Napalm" solution in gasoline used in Examples II and III is about 110 grams, measured in a Chemical Warfare Service Gardner Consistometer. Thixotropic gasoline gels containing larger quantities of "Napalm" (e. g. 12% gels, and gels measuring 400 and 850 grams respectively in the Gardner Consistometer) have flow characteristics analogous to the gelled 4.5% "Napalm" solution in gasoline, i. e., nearly uniform and comparatively small increase of pressure drop with increase in rate of flow and without turbulence. However, because of the great initial viscosity of such gels they are not as suitable for piping operations as gels not so highly thickened. Although I do not desire to limit myself to any particular amount of "Napalm" to be added to the gasoline for the purposes of my invention, and prefer to permit the actual formulation to be varied in accordance with the particular pipe used or rate of flow contemplated, I have found in my experiments that thixotropic gels suitable for transmission through a pipe line are advantageously made by adding from about 2% to about 5% by weight of "Napalm" to gasoline.

As appears from the foregoing examples, particularly spectacular reductions in pressure drop are obtained by the use of my invention in small pipes. While there is a possibility that at very greatly increased rates of flow even a thixotropic fluid may become turbulent, the advantage of streamlined flow is obtained by the use of a thixotropic fluid at substantially all commercially feasible rates of flow through a pipe line.

In the foregoing description of my invention I have given several detailed instances of its practical application. I wish it to be understood, however, that such details are given only as illustrations and not as limitations of the scope of my invention. Variations of my specific examples and data within the broad aspects of my invention will readily occur to the expert and are thus deemed to be within the scope of my invention. I thus desire to claim my invention broadly and to be limited only by the appended claims.

I claim:

1. The process of conveying a liquid through a pipe, comprising adding to said liquid a thickener capable of converting said liquid into a thixotropic gel, and pumping the same through a pipe at a rate of speed sufficient to lower its resistance to flow below the resistance to flow of the unthickened liquid at the same rate of speed.

2. The process of conveying a liquid through a pipe, comprising adding to said liquid a thickener soluble in said liquid and capable of converting said liquid into a thixotropic gel, pumping the same through a pipe at a rate of speed sufficient to lower its resistance to flow below the resistance to flow of the unthickened liquid at the same rate of speed, and finally breaking said gel.

3. The process of conveying a liquid through a pipe, comprising adding to said liquid a thickener capable of converting said liquid into a thixotropic gel, pumping the same through a pipe at a rate of speed sufficient to lower its resistance to flow below the resistance to flow of the unthickened liquid at the same rate of speed, and finally breaking said gel and recovering said thickener.

4. The process of conveying gasoline through a pipe, comprising adding to said gasoline a thickener capable of converting said gasoline into a thixotropic gel, and pumping the gelled substance through a pipe at a rate of speed sufficient to lower its resistance to flow below the resistance to flow of unthickened gasoline at the same rate of speed.

5. The process of conveying gasoline through a pipe, comprising adding to said gasoline a gasoline-soluble thickener capable of converting said gasoline into a thixotropic gel, pumping the gelled substance through a pipe at a rate of speed sufficient to lower its resistance to flow below the resistance to flow of unthickened gasoline at the same rate of speed, and finally breaking said gel.

6. The process of conveying gasoline through a pipe, comprising adding to said gasoline a gasoline-soluble polar compound capable of converting said gasoline into a thixotropic gel, pumping the gelled substance through a pipe at a rate of speed sufficient to lower its resistance to flow below the resistance to flow of unthickened gasoline at the same rate of speed, and finally breaking said gel.

7. The process of conveying gasoline through a pipe, comprising adding to said gasoline a thickener capable of converting said gasoline into a thixotropic gel, pumping the gelled substance through a pipe at a rate of speed sufficient to lower its resistance to flow below the resistance to flow of unthickened gasoline at said rate of speed, and finally breaking said gel and separating said gasoline and said thickener.

8. The process of conveying gasoline through a pipe, comprising converting said gasoline into a thixotropic gel by adding an aluminum soap to said gasoline, and pumping the gelled substance through a pipe at a rate of speed sufficient to lower its resistance to flow below the resistance to flow of unthickened gasoline at said rate of speed.

9. The process of conveying gasoline through a pipe, comprising adding to said gasoline an aluminum soap capable of converting said gasoline into a thixotropic gel, pumping the gelled substance through a pipe at a rate of speed sufficient to lower its resistance to flow below the resistance to flow of unthickened gasoline at said rate of speed, and finally breaking said gel and separating said gasoline and said soap.

10. The process of conveying gasoline through a pipe, comprising converting said gasoline into a thixotropic gel by adding aluminum naphthenate to said gasoline, and pumping the gelled substance through a pipe at a rate of speed sufficient to lower its resistance to flow below the resistance to flow of unthickened gasoline at said rate of speed.

11. The process of conveying gasoline through a pipe, comprising converting said gasoline into a thixotropic gel by adding the aluminum soap of a coconut oil acid to said gasoline, and pumping the gelled substance through a pipe at a rate of speed sufficient to lower its resistance to flow below the resistance to flow of unthickened gasoline at said rate of speed.

12. The process of conveying gasoline through a pipe comprising converting said gasoline into a thixotropic gel by adding a mixture of aluminum naphthenate and the aluminum soap of a coconut oil acid to said gasoline, and pumping the gelled substance through a pipe at a rate of speed sufficient to lower its resistance to flow below the resistance to flow of unthickened gasoline at said rate of speed.

13. The process of conveying gasoline through a pipe, comprising converting said gasoline into a thixotropic gel by adding a mixture of the aluminum soap of a coconut oil acid and aluminum naphthenate and aluminum oleate to said gasoline, and pumping the gelled substance through a pipe at a rate of speed sufficient to lower its resistance to flow below the resistance to flow of unthickened gasoline at said rate of speed.

14. The process of conveying gasoline through a pipe, comprising converting said gasoline into a thixotropic gel by adding a mixture of about 2 parts of the aluminum soap of a coconut oil acid and about 1 part of aluminum naphthenate and about 1 part of aluminum oleate to said gasoline, and pumping the gelled substance through a pipe at a rate of speed sufficient to lower its resistance to flow below the resistance to flow of unthickened gasoline at said rate of speed.

15. The process of conveying gasoline through a pipe, comprising adding to said gasoline from about 2.5% to about 5% by weight of an aluminum soap, thereby converting said gasoline into a thixotropic gel, pumping the gelled substance through said pipe at a rate of speed sufficient to lower its resistance to flow below the resistance to flow of unthickened gasoline at said rate of speed, and breaking said gel and separating said gasoline and said soap.

16. The process of conveying gasoline through a pipe, comprising adding to said gasoline from about 2.5% to about 5% by weight of a mixture of about 2 parts of the aluminum soap of a coconut oil acid and about 1 part of aluminum naphthenate and about 1 part of aluminum oleate, thereby converting said gasoline into a thixotropic gel, pumping the gelled substance through said pipe at a rate of speed sufficient to lower its resistance to flow below the resistance to flow of unthickened gasoline at said rate of speed, and breaking said gel and separating said gasoline and aluminum compounds.

17. The process according to claim 4, wherein said thickener is rubber.

KAROL J. MYSELS.

No references cited.